March 29, 1938.  E. SCHARNEWSKI  2,112,790
CLAW CLIPPER FOR BIRDS AND DOGS
Filed March 2, 1936
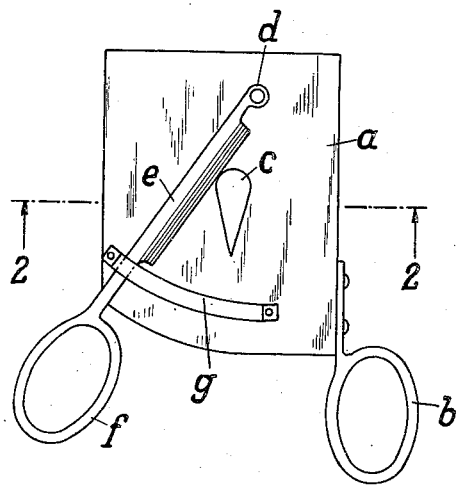
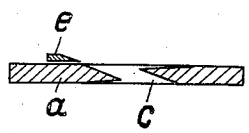
Inventor:
E. Scharnewski
By: Glascock Downing & Seebold
Attys.

Patented Mar. 29, 1938

2,112,790

UNITED STATES PATENT OFFICE 2,112,790

CLAW CLIPPER FOR BIRDS AND DOGS

Emil Scharnewski, Petershagen, near Berlin, Germany

Application March 2, 1936, Serial No. 66,736
In Germany June 17, 1935

1 Claim. (Cl. 128—318)

In clipping, more especially dogs' claws, in the manner hitherto usual, by means of nippers or shears the ends of the claws are in most cases split after clipping, since the clipping hitherto only took place with two superposed surfaces.

Clipping by means of nippers or shears caused the animals pain more especially those with stronger claws, since the claw was pressed apart by the nippers or shears when clipped and the result was that these animals retained permanently a great fear of claw clipping and resisted it with all their force, so that clipping of the claws was often quite impossible.

The present invention prevents splitting since the claw is gripped in two cutting surfaces and a third movable cutting surface forces the claw prior to clipping against the cutting surfaces which are pointed towards one another and thus clipping is effected from three sides. At the same time this prevents spreading of the claw and the animal is protected from pain.

In order to find out how far the blood vessels extend so that they are not injured in clipping, the claw clipper in trimming is held as far as possible against a light (similarly as is done with eggs in the hollow of the hand, when it is desired to test them for specks). While the plate forms the shadow, the light falls with full force through the slot on to the claw, in which case the blood vessel can be very clearly seen.

In order not to injure the blood vessels, the claw is pushed into the slot as far as the blood vessel. After clipping there then remains on the clipped claw, starting from the end of the blood vessel, a portion of claw corresponding to the thickness of the plate, thus precluding any injury to the blood vessels. Consequently if the plate is 1 mm. thick there still remains 1 mm. claw beyond where the blood vessel extends in the claw.

The accompanying drawing illustrates a constructional form of the invention in

Figure 1 in plan view and in

Figure 2 in a section along line 2—2 of Fig. 1.

A plate $a$ of any desired shape and provided with a handle $b$, has a slot $c$, which tapers acutely towards one end, and the lateral edges of which according to Fig. 2, which reproduces the device on a much enlarged scale are bevelled oppositely to one another. On the plate $a$ is rotatably secured at $d$ a blade $e$ with handle $f$, which is secured against lifting by a guide strip $g$.

The construction of the edges of the slot $c$ must be such that the claw inserted in the tapered end of the slot cannot be withdrawn again by the animal.

As is well known the claws of small animals and birds are of V-shape cross section and this shape of claw determines the shape of the slot in the claw clippers. The claw which is to be clipped can be conveniently placed through the rounded end of the slot $c$ and then the claw is pushed downwardly with its front edge in the slot. The claw is pressed somewhat into the taper slot and the sharp edges of the slot are forced into the claw so as to prevent it being withdrawn. When the movable blade $e$ is rotated it cuts into the claw and also presses the claw most firmly against the cutting edges of the slot $c$ so that the claw is cut off by a clipping action from three sides.

What I claim is:

A claw clipper for birds and dogs comprising a plate having a slot, which is tapered towards one end and the edges of which are bevelled off to produce two sharp edges not in the same plane and one adjacent to each side of the plate, and a blade on the plate rotatably movable over said slot.

EMIL SCHARNEWSKI.